June 4, 1940.  W. J. HUND ET AL  2,203,217
PROCESS FOR RECOVERING ALKYL PHENOLS FROM PETROLEUM OILS
Filed May 25, 1937
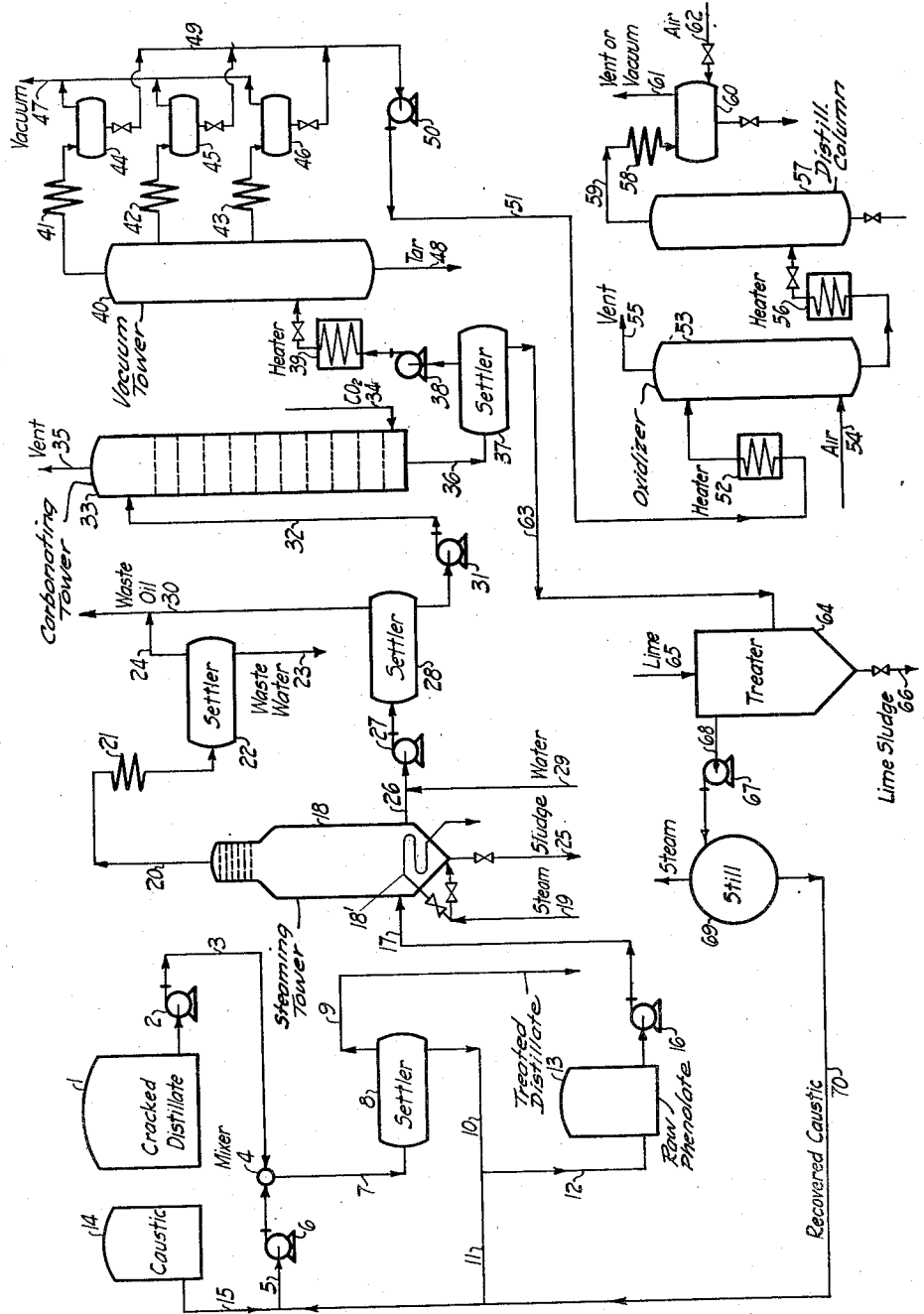
Inventors:
Walter J. Hund
Samual Benson Thomas
Daniel B. Luten Jr.
By their Attorney:

Patented June 4, 1940

2,203,217

UNITED STATES PATENT OFFICE 2,203,217

PROCESS FOR RECOVERING ALKYL PHENOLS FROM PETROLEUM OILS

Walter J. Hund and Samuel Benson Thomas, Oakland, and Daniel B. Luten, Jr., Berkeley, Calif., assignors to Shell Development Company, San Francisco, Calif., a corporation of Delaware Application May 25, 1937, Serial No. 144,658

8 Claims. (Cl. 260—627)

This invention relates to a method for economically recovering the minute quantities of alkyl phenols contained in petroleum oils, especially in cracked distillates, and more particularly deals with a method for recovering such alkyl phenols in a commercially pure state by simple and inexpensive means.

While in terms of absolute quantities petroleum oils constitute an enormous potential source of alkyl phenols, the concentration of the latter in petroleum oils is so low and yields have been so poor as to make their extraction commercially unattractive. Furthermore, alkyl phenols recovered from petroleum oils by efficient extraction are usually contaminated with many different impurities, which have necessitated extensive and costly purification processes in order to produce commercially useful products comparable in quality with those obtained from coal tars.

It is the purpose of this invention to recover substantially completely the small amounts of alkyl phenols contained in petroleum oils and to purify them economically and to a degree sufficient to meet current commercial standards.

Alkyl phenols are used primarily in the manufacture of resins of the type of formaldehyde-phenol resins, as flotation and frothing agents in the flotation of ores, gum inhibitors in gasoline and oxidation inhibitors in general, in the synthesis of cresyl phosphates which are useful as solvents and extreme pressure dopes for lubricants, etc. Alkyl phenols used in the manufacture of resins require an especially high degree of purity, and the expression "commercially pure" as herein used signifies a degree of purity required by the above uses.

Our process consists essentially of the following four main steps:

(1) Extracting a petroleum oil containing alkyl phenols, while in the liquid state, with an aqueous alkali metal hydroxide solution of an original concentration of 35–50% under conditions to form two layers and separating the layers;

(2) Subjecting the aqueous layer to a prolonged steaming with substantially saturated steam to drive off certain impurities and to precipitate a sludge which is separated, and continuing to steam until no further sludge precipitates;

(3) Carbonating the steamed clear liquid aqueous layer with carbon dioxide to liberate alkyl phenols, thereby forming two layers, and separating the layers;

(4) Rapidly distilling the liberated alkyl phenols under vacuum.

If desired the distilled alkyl phenols may be further purified by oxidation, preferably with air at a temperature between about 140°–150° C. followed by redistillation, and the redistilled product may further be blown at about room temperature to remove possible foul odors.

The difficulties encountered when attempting satisfactorily to recover and refine alkyl phenols from petroleum oils are to some extent reflected in the patent literature. In the past various rather involved methods have been suggested for the purification of alkyl phenols derived from petroleum oils. Thus, Blair in U. S. Patent 1,933,410 describes a method comprising acidifying an alkaline extract from a cracked petroleum distillate to liberate organic acidic substances, and separating and distilling the same to produce a fraction boiling between 180° to 275° C. This fraction is reduced to convert disulfides to mercaptans. The reduced acids are fractionally distilled to produce several fractions, the several fractions are air blown to reconvert mercaptans to disulfides, and the latter are separated from the fractions by distillation.

Drennan, in U. S. Patent 2,048,784, suggests extracting petroleum oil containing alkyl phenols with aqueous alkali metal hydroxide of 20–25% concentration, further extracting the alkaline phenolate solution so obtained with an organic liquid such as butyl or amyl alcohol, transferring the phenolate from the alcohol into water, removing the excess water by distillation, and steaming the residue.

Merrill, in U. S. Patent 2,000,244, proposes to extract acidic components from petroleum with aqueous alkali metal hydroxide and acidifying the resulting solution to liberate the acidic components. To the liberated oily layer sodium carbonate is added to neutralize naphthenic acids but not phenols. After further adding some Edeleanu extract of kerosene or the like to the neutralized layer, the latter is distilled with steam. Water, neutral oil and phenols are taken overhead and condensed. The condensate is again extracted with aqueous alkali metal hydroxide and the resulting aqueous solution is acidified, liberated alkyl phenols are separated and are further distilled over sodium carbonate.

The above described as well as other known methods have one or several disadvantages. Either they entail poor recovery of alkyl phenols due to incomplete extraction or high treating losses, or they yield products incapable of meeting the commercial standards, or they consume an excessive amount of chemicals due, for instance, to double caustic extraction and acidification. In no instance has it been possible to recover substantially all alkyl phenols from petroleum oils in a commercially pure state by a method involving a consumption of chemicals not materially greater than required in our process hereinafter described in detail.

Different petroleum fractions contain widely different amounts of alkyl phenols. Most straight run oils contain very little, if any, while cracked oils often contain relatively large amounts thereof. Since phenol, the lowest boiling member of the group of hydroxy aromatic compounds, boils at about 180° C., it is reasonable to expect that distillates boiling below about 175° C. contain no phenols or alkyl phenols. Cracked distillate fractions boiling between about 175°–300° C. usually contain appreciable quantities, and concentration peaks normally appear in the fractions boiling between about 180°–230° C. In order to reduce the volume of petroleum oil to be extracted, it is therefore desirable fractionally to distill the petroleum oil to separate a fraction comprising an alkyl phenol concentrate which contains the bulk of the desired phenols.

The step of extracting the petroleum oil consists essentially of treating the liquid oil with an amount of an aqueous alkali metal hydroxide solution, preferably sodium or potassium hydroxide, of an original concentration of 35–50%, which amount contains a quantity of free hydroxide only slightly in excess of that required to convert all of the alkyl phenols contained in the oil to alkali metal alkyl phenolates. It is known that when alkyl phenols are added to caustic of about 35–50% concentration a precipitation of phenolates takes place, and upon further addition of a certain minimum critical amount of alkyl phenols, which amount is less than that required to consume all of the free alkali metal hydroxide, the precipitated phenolates are redissolved in the aqueous phase. Thus by adding to an alkali metal hydroxide solution of the above strength the minimum critical amount of alkyl phenols required to form a single aqueous phase of phenolates, a solution is obtained which contains besides the phenolates considerable quantities of free alkali metal hydroxide. This critical amount varies considerably with the concentration of the hydroxide and the type of alkyl phenols added. For instance, when using a mixture of alkyl phenols of an average molecular weight of xylenols, the critical amount required to produce a single phase would be as follows for aqueous sodium hydroxide solutions of various concentrations:

| Original concentration of NaOH in caustic solution | Critical amount of alkyl phenols percent by weight of solution |
|---|---|
| 35% | 37 |
| 40% | 42 |
| 45% | 45 |
| 50% | 47 |

The resulting phenolate solution containing free alkali metal hydroxide is the most effective extractant for alkyl phenols from hydrocarbon oils, if contacted with the oil in the proper proportion. The amount of alkaline alkyl phenolate solution used to treat a given amount of oil containing alkyl phenols should be such that the amount of alkyl phenols in the oil is sufficient to convert a portion only of the free alkali hydroxide to alkali phenolates, and the enriched phenolate solution thus produced should preferably contain a mol ratio of alkyl phenols to alkali metal between the limits of .80 and .98.

In its most efficient form the extraction is carried out as follows: An alkaline alkyl phenolate solution containing at least the critical amount of alkyl phenols is continuously circulated. At some point of the circuit it is contacted with an amount of oil containing alkyl phenols, so that a substantial portion of the free alkali hydroxide is converted to phenolates. The oil and the aqueous phenolate solutions are then separated, the oil being substantially free from alkyl phenols after this extraction. A portion of the phenolate solution is then withdrawn from circulation to be treated as will be described hereinafter. The remainder of the alkyl phenolate solution is mixed with an amount of fresh caustic of 35–50% concentration sufficient to replace the amount of alkali metal withdrawn before, and the resulting mixture containing free alkali is again contacted with fresh oil as described above.

While by this method of extraction substantially complete removal of alkyl phenols from petroleum oil is accomplished, the alkyl phenols so extracted are highly contaminated with impurities. Besides alkyl phenols, other substances are dissolved in the aqueous phenolate solution, notably naphthenic and other carboxylic acids, neutral hydrocarbons, sulfur compounds, nitrogen bases, resinous bodies, etc., and in addition the aqueous solution may contain varying amounts of emulsified heavy tarry material, part of which may settle out upon prolonged standing. Alkyl phenols liberated from the untreated phenolate solution by acidification may contain 10 or more per cent of neutral oil, sulfur in excess of 1%, and nitrogen bases as high as 6 or 8%.

The phenolate solution containing neutral, basic and sulfurous impurities is now subjected to a prolonged steaming preferably at substantially normal pressures and with substantially saturated steam. The use of highly superheated steam or the heating of the phenolate solution substantially above 100° C. is disadvantageous because it leads to excessive losses of alkyl phenols by vaporization and by way of undesirable condensation and/or decomposition reactions of the phenols themselves.

This steaming in combination with the described method of extracting the alkyl phenols from the petroleum oil is the most essential part of our process. Unless it is carried far enough it is almost impossible to obtain by any subsequent treatment, or combination of simple treatments, except by double use of alkali metal hydroxide extraction and acidification as for instance described by Merrill in U. S. Patent 2,000,244, alkyl phenols of sufficient stability and purity to meet even the most liberal commercial requirements.

During the early stages of the steaming period, neutral oils, nitrogen bases, sulfur compounds and a small portion, amounting to less than 20%, of the alkyl phenols of relatively low acidities are vaporized and removed overhead. Steaming, however, must be continued for some time after removal of the volatilizable compounds has been substantially completed. This point is recognized when the exhaust steam, upon condensation, no longer turns turbid. While steaming proceeds, sludge is being formed and precipitated, and when the phenolate solution is allowed to rest, two separate layers form, an aqueous layer and a heavier sludge layer. Upon continued steaming the amount of sludge formed eventually reaches a maximum, so that when the sludge is separated and the desludged aqueous layer is further steamed, no additional sludge is formed. The time of steaming required to reach this point of maximum sludge formation normally varies between about 4 and 16 hours, alkyl phenolates derived from relatively low-boiling distillates normally requiring shorter time for complete steaming than alkyl phenolates obtained from heavier oils.

It is absolutely essential that steaming be carried out to the maximum point of sludge formation. While the reactions responsible for the formation of sludge are not quite understood, it appears that its production is due to a combination of removing neutral oils which act as dispersers for actual sludge, i. e., sludge which is present from the beginning, and condensation reactions which take place during the steaming after removal of neutral oils and lead to the formation of additional sludge, for convenience called herein potential sludge. Apparently nitrogen bases take active part in these condensation reactions forming high boiling compounds, and although a considerable portion of the nitrogenous condensation products may remain in the alkaline solution after steaming they later form part of the tarry residue produced in the subsequent vacuum distillation of the liberated alkyl phenols. It appears that considerable time is required to condense the nitrogen bases, and if steaming is too short, condensation remains incomplete and the unreacted portion thereof will go overhead in the subsequent vacuum distillation jointly with the alkyl phenols. Since nitrogen bases, together with sulfur compounds are the most harmful and obnoxious impurities in commercial alkyl phenols, it is readily seen how important it is to conduct the steaming to the point of maximum sludge formation.

We are aware that alkyl phenols have been produced by extracting coal tars with aqueous caustic, blowing the extract with steam, liberating the phenols and distilling and blowing same with air. However, in contrast to the above, phenolate solutions obtained from coal tar distillates with alkali metal hydroxide solutions of customary concentrations, which are generally much lower than those hereinbefore described, do not produce sludge upon steaming, perhaps because phenolate solutions obtained with relatively weak alkali hydroxide solutions are comparatively little contaminated with impurities and also because coal tar phenols, having been in contact with ammonia at elevated temperatures in the course of their formation have already undergone a preliminary purification process. But, whereas extraction of phenols from coal tar distillates with relatively weak alkali hydroxide solutions is commercially practical because the concentration of phenols in these distillates may be of the order of 7 to 35%, (see U. S. Patent 1,991,979), the concentration of alkyl phenols in petroleum oils is usually below .5% and more often about .1% or below. Obviously more effective means of extraction must be applied to petroleum oils than to coal tar distillates, and the greater efficiency of extraction is at least partly responsible for the greater difficulties experienced in the subsequent refining of the alkyl phenols, impurities which are normally associated with petroleum being extracted as well.

Aside from the relative amounts of the respective impurities, it also appears that there are considerable differences regarding their nature. As pointed out before, in petroleum alkyl phenols a class of little known nitrogen bases constitutes the most harmful impurities, which nitrogen compounds seem to be almost completely absent from coal tar phenols. For this reason the extent of the steaming just sufficient to remove neutral oils has proven adequate in the purification of coal tar phenols, but in the case of purification of petroleum phenols has met with failure; and before our discovery that steaming must be prolonged to give time for the condensation reactions described above it was impossible to obtain commercially pure alkyl phenols in the simple manner proposed by us.

When the steaming has progressed so that upon further steaming no additional sludge is formed, the precipitated sludge is separated from the phenolate solution. Usually the desludged solution contains emulsified organic matter other than sludge, which refuses to separate at this point. In such a case diluting the phenolate solution with at least an equal volume of water will readily break the emulsion. We have found it very convenient as a rule to dilute the solution to about 10%. If this does not produce a complete break of the emulsion, resort may be had to centrifugation or filtration through a suitable medium which is preferentially wetted by the organic matter.

The phenolate solution is now perfectly clear and of much lighter color than before steaming, since neutral oils capable of dissolving sludge have been removed substantially quantitatively as well as most sludge-forming compounds and a portion of the sulfur compounds. This clear phenolate solution is now carbonated by introducing into it carbon dioxide or a gas containing carbon dioxide such as flue gas, or lime kiln gas, etc., in an amount so that preferably the resulting aqueous solution contains about an equi-molar mixture of carbonate and bicarbonate. Since phenols are acids weaker than carbon dioxide, they are liberated while the stronger carboxylic acids as well as hydrogen sulfide, if present, remain in the aqueous solution as alkali metal salts. Together with the alkyl phenols, organic hydrosulfides such as thio phenols and mercaptans not removed by steaming, are liberated. The liberated alkyl phenols form a separate layer and are removed from the resulting aqueous carbonate solution in which the carboxylic acids are retained. The alkyl phenols may be water washed, such a wash usually lowering the sulfur content by about .2 to .3%. If desired, the carboxylic acids may be liberated and recovered from the carbonated solution, for instance by treating same with a relatively strong acid, such as sulfuric, sulfurous, hydrochloric, phosphoric acid, etc.

The separated alkyl phenols which usually contain a relatively small amount of sulfur compounds and more or less of dark colored resinous or tarry matter, are now subjected to a quick distillation, preferably a flash distillation under a reduced pressure, e. g., below about 25 mm. mercury. Since the resinous or tarry compounds associated with the crude alkyl phenols are thermally unstable and crack very readily, thereby forming both neutral oils and tar, distillation must proceed at the lowest practical temperature, preferably below 180° C. and at the highest rate possible. For this reason, purification at this stage of the process by precision fractionation is not practical, excepting the removal of residual tarry compounds and the like, which can be separate in a rapid flash distillation, and the production of fractions of different boiling ranges. If the steaming of the phenolate solution has been carried out to the point of complete sludge separation as hereinbefore described, close fractional distillation for the purpose of purification other than removal of tar or to obtain sharp cuts is quite unnecessary.

The distillates resulting from this treatment are mixtures of alkyl phenols of relatively light colors and fair color stabilities, substantially free from neutral and basic organic compounds, and having moderate sulfur contents. If products of still higher color stability and lower sulfur content are required, the distilled alkyl phenols may be subjected to an oxidizing treatment under conditions to oxidize organic hydrosulfides such as thio phenols and mercaptans to disulfides or sulfonic acids, without substantially oxidizing the phenols. This can, for instance, be accomplished by blowing with an excess air at a temperature between about 140°–150° C., if desired in the presence of an oxidizing catalyst which is not floated by alkyl phenols such as a sulfide of Ni, Co, Pb, Cu, etc. During this oxidation unstable phenols are also converted to high boiling tarry substances, the latter being readily removable by a subsequent redistillation. Distillates so obtained occasionally have a foul odor which, however, can easily be removed by blowing with air at normal room temperature.

Referring now to the attached drawing in which a flow diagram of a preferred form of our process is shown, tank 1 contains a petroleum oil containing alkyl phenols, such as cracked distillate boiling, for instance, between 180°–230° C. This distillate is pumped by pump 2 in line 3 to mixer 4. An aqueous alkali metal alkyl phenolate solution containing free alkali metal hydroxide is introduced by pump 6 in line 5, into mixer 4 where it is mixed with the distillate. The proportions of distillate and alkyl phenolate solution are such that the amount of alkyl phenols in the distillate is but slightly less than that which would be required to convert all of the free alkali metal hydroxide in the phenolate solution to alkali metal phenolate. The resulting mixture then passes through line 7 to settler 8 in which treated distillate substantially free from alkyl phenols rises to the top and is withdrawn through line 9. Aqueous alkyl phenolate solution is conveyed through bottom line 10 and is split into two portions, one of which is recirculated through lines 11 and 5 by pump 6 to mixer 4 and the other of which is conducted through line 12 to tank 13. An amount of fresh alkali metal hydroxide of 35–50% concentration having an alkali metal content equal to that of the portion withdrawn to tank 13 is injected into line 5 from tank 14 through line 15, or from line 70, as will be described later. The amounts of phenolate withdrawn from the circulating stream and of fresh alkali metal hydroxide added thereto are preferably such that the concentration of alkyl phenols in the phenolate solution never drops to or below the critical point at which phenolates are precipitated from the solution.

The raw phenolate solution in tank 13 is transferred by pump 16 in line 17 to steaming tower 18 equipped with heating coil 18′ near its bottom. In tower 18 the phenolate solution is steamed to remove volatilizable impurities and to precipitate sludge or tar, the steaming being continued for a sufficient time so that upon further steaming no additional sludge is precipitated. Steam is introduced through line 19, and exhaust steam containing vapors of hydrocarbons and other impurities pass through vapor line 20 and are condensed in condenser 21. The condensate is separated in settler 22, waste water being withdrawn through line 23 and waste oil through line 24.

When the steaming in tower 18 has been substantially completed in the manner hereinbefore described, the steamed solution is allowed to settle. The heavy precipitated sludge is drawn off through sludge line 25 and the steamed phenolate solution is transferred by pump 27 in line 26 to settler 28. An amount of water sufficient to permit easy settling of remaining entrained insoluble inorganic matter is injected through line 29 into the phenolate solution passing through line 26. Entrained matter rises to the top of settler 28 and is discarded through line 30.

Settling in settler 28 is continued until the phenolate solution is perfectly clear. The clear solution is then conveyed by pump 31 in line 32 to the top of carbonating tower 33, whence it runs downward over baffles, bubble plates or other contact means in the tower in countercurrent to carbon dioxide or gas containing carbon dioxide, which is introduced through line 34. Carbon dioxide is absorbed and alkyl phenolates are liberated. Non-absorbed gas leaves the tower 33 through vent line 35 and carbonized aqueous solution passes through bottom line 36 to settler 37. Liberated alkyl phenols are allowed to rise to the top, and are then conveyed by pump 38 through heater 39 to vacuum tower 40, to be flash distilled and, if desired, fractionated. Several alkyl phenol fractions may be withdrawn from the vacuum tower through coolers 41, 42 and 43, the separated fractions being run into run-down tanks 44, 45 and 46 respectively. Manifold 47 connects the tanks to the source of the vacuum. Pitch-like residue from the flash distillation is withdrawn from the vacuum tower 40 through bottom line 48.

If it is desired further to purify one or several of the alkyl phenol fractions in tanks 44 to 46, a fraction may be conveyed through manifold 49 by pump 50 in line 51 and through heater 52, in which it is heated to about 140°–150° C. The heated alkyl phenols then enter oxidizing tower 53 in which they are contacted with air for the necessary length of time, air being introduced through line 54 and unreacted gas being vented through line 55. From the oxidizer 53 the phenols are transferred through heater 56 to distillation column 57, which is preferably kept under substantial vacuum. Alkyl phenols are vaporized and go through condenser 58 in line 59 to tank 60. Line 61 connects tank 58 to the source of the vacuum. If the condensate accumulated in the tank 60 has a foul odor, air may be blown therethrough by way of line 62, whereby the odor is improved.

The aqueous layer in settler 37 comprising largely a sodium carbonate solution usually containing alkali metal naphthenates, a small amount of phenolates and possibly other salts, is transferred through line 63 to treater 64 where an amount of lime is added by way of line 65, sufficient to precipitate substantially all of the carbonates, naphthenates, and other salts. Lime sludge is settled and removed through discharge 66, while recovered alkali metal hydroxide solution is conveyed by pump 67 in line 68 to still 69, where it is reconcentrated to the required concentration of 35-50%. Reconcentrated alkali metal hydroxide is then returned through lines 10, 11 and 5 to pump 6 and mixer 4 as hereinbefore described.

Naphthenic acids may be recovered from the lime sludge by suitable separation of the naphthenates from the carbonates, followed by acidification of the former.

The following example further illustrates our process:

A cracked distillate boiling from 180°-230° C. obtained in the liquid phase cracking of a California gas oil was extracted with the proper amount of 40 Bé. aqueous sodium hydroxide solution, so that about 95% of the free hydroxide was converted to sodium salts of the acidic compounds contained in the distillate. The resulting solution which was turbid and in thin layers of opaque deep red color was steamed for 14 hours and was then allowed to settle. A black sludge settled out which was removed. Upon further steaming no additional sludge formed. The resulting clear deep red solution was diluted with about 3 times its own volume of water and was again allowed to settle. This time an oil settled to the top which was removed; into the remaining aqueous solution a measured amount of carbon dioxide was introduced, sufficient to liberate all the alkyl phenols contained in the alkaline solution.

The liberated alkyl phenols were dark in color. They were separated and quickly distilled in a batch still under an absolute pressure of 10 mm. mercury. The first 10% of the distillate were discarded. The following 80% were recovered, and a heavy pitch amounting to about 10% of the charge was left in the still as still bottoms.

The recovered middle fraction was yellowish, and on prolonged standing turned yellowish red.

A portion of this fraction was blown with air at 145° C. for about 10 hours, the blown portion was redistilled, and the distillate was again blown for a short time at room temperature. A light yellowish product was obtained which remained pale upon storage for several months. The following table shows comparative properties of free alkyl phenols obtained at the various stages of the process:

| Stage | Percent neutral oil | Percent nitrogen | Percent sulfur | Color | Color stability |
|---|---|---|---|---|---|
| Before steaming. | 6.0 | 0.6 | 0.9 | Black | |
| After steaming. | Trace | 0.4 | 0.6 | Dark | |
| After vacuum distillation. | Trace | 0.04 | 0.15 | Yellow | Turned red. |
| After air oxidation and redistillation. | Trace | 0.03 | 0.10 | White | White. |

The alkyl phenols obtained before the oxidation step are suitable as frothing agents in the flotation of ores, while the product obtained after oxidation and redistillation meets the requirements for the manufacture of formaldehyde phenol resins.

When it was attempted to purify the alkyl phenols by oxidation without sufficient steaming, products were obtained which had very poor color stabilities. Furthermore, if the steaming was very far from being complete the products contained relatively high amounts of neutral oils and particularly nitrogen bases. The presence of the latter in noticeable proportions precludes the use of the alkyl phenols for most industrial purposes.

In order further to demonstrate the importance of prolonged steaming until substantially all sludge forming compounds have been precipitated, comparative runs were made with and without sufficient steaming. Alkyl phenols were extracted from a cracked light stove oil with a 40° Baumé sodium hydroxide solution. The phenolate solution was divided into two portions, one of which was steamed to completed sludge precipitation and the other was steamed for a relatively short period only, sufficient, however, to drive off the neutral oils. Both portions were then carbonized to liberate alkyl phenols, which were vacuum distilled to produce three fractions each: a 10% head fraction comprising mainly water, an 80% middle fraction consisting essentially of alkyl phenols, and a 10% residue. The nitrogen distribution in these fractions was as follows:

| Fraction | With sufficient steaming | Without sufficient steaming |
|---|---|---|
| | Percent | Percent |
| Head fraction | .01 | .06 |
| Middle fraction | .13 | .73 |
| Residue | 2.00 | 1.43 |
| Total | 2.14 | 2.22 |

As will be noted the prolonged steaming effected a condensation of nitrogen compounds which cannot be vaporized and expelled by steaming and which apparently cannot be removed in any manner other than by prolonged steaming for a time sufficient to condense them to tarry condensation products.

We claim as our invention:

1. In the process of producing commercially pure alkyl phenols from a petroleum distillate containing small quantities of the same, the steps comprising extracting the distillate with a quantity of an aqueous alkali metal hydroxide solution of 35-50% concentration to form an alkali metal alkyl phenolate solution containing free alkali metal hydroxide and a sufficient amount of chemically combined alkyl phenols to prevent precipitation of the alkyl phenolates, said solution containing impurities which form a precipitate only after steaming beyond the point at which the overhead product produced by steaming condenses into a substantially clear condensate, steaming the resulting aqueous alkaline solution at about 100° C. to expel volatile impurities whereby an overhead product is obtained the condensate of which is turbid, until a point is reached in the steaming operation at which said condensate is substantially clear and no longer turbid, continuing the steaming beyond said point at about 100° C. for a time sufficient to precipitate substantially all of the sludges capable of precipitation by steaming, separating the sludges from the solution of alkyl phenolates, carbonating the desludged solution with an amount of carbon dioxide sufficient to liberate alkyl phenols, thereby forming two layers, an alkyl phenol layer and an aqueous layer, separating the layers, and distilling the alkyl phenols under conditions to prevent substantial cracking.

2. The process of claim 1 in which the steaming is carried out with saturated steam at about atmospheric pressures.

3. In the process of producing commercially pure alkyl phenols from a petroleum distillate containing small quantities of the same and nitrogen bases commonly associated with petroleum distillates, the steps comprising extracting the distillate with a quantity of an aqueous alkali metal hydroxide solution of 35–50% concentration to form an alkali metal alkyl phenolate solution containing free alkali metal hydroxide and a sufficient amount of chemically combined alkyl phenols to prevent precipitation of the alkyl phenolates, and nitrogen bases and other impurities, said solution containing potential sludge which forms a precipitate only after steaming beyond the point at which the overhead product produced by steaming condenses into a substantially clear condensate, steaming the resultant aqueous alkaline solution at about 100° C. to expel volatile impurities, thereby precipitating actual sludge and producing an overhead product the condensate of which is turbid, until a point is reached in the steaming operation at which said condensate is substantially clear and no longer turbid, continuing said steaming of the solution at about 100° C. beyond said point chemically to condense nitrogen bases to higher boiling compounds and to precipitate potential sludge until no additional sludge is precipitated upon further steaming, separating the sludge from the solution of alkyl phenolates, carbonating the desludged solution with an amount of carbon dioxide sufficient to liberate alkyl phenols, thereby forming two layers, an alkyl phenol layer containing the condensed nitrogen bases and an aqueous layer, separating the layers and distilling the alkyl phenols under conditions to prevent substantial cracking and to retain the condensed nitrogen bases in the residue.

4. In the process of producing commercially pure alkyl phenols from a petroleum distillate containing small quantities of the same, the steps comprising extracting the distillate with a quantity of an aqueous alkali metal hydroxide solution of 35–50% concentration to form an alkali metal alkyl phenolate solution containing free alkali metal hydroxide and a sufficient amount of chemically combined alkyl phenols to prevent precipitation of the alkyl phenolates, said solution containing impurities which form a precipitate only after steaming beyond the point at which the overhead product produced by steaming condenses into a substantially clear condensate, steaming the resulting aqueous alkaline solution at about 100° C. to expel volatile impurities, whereby an overhead product is obtained the condensate of which is turbid, until a point is reached in the steaming operation at which said condensate is substantially clear and no longer turbid, continuing the steaming beyond said point at about 100° C. for a time sufficient to precipitate substantially all of the sludges capable of precipitation by steaming, separating the sludges from the solution of alkyl phenolates containing emulsified organic matter, diluting the desludged solution with at least an equal volume of water, thereby precipitating the emulsified organic matter, separating the precipitated matter from the solution of phenolates, carbonating the diluted solution with an amount of carbon dioxide sufficient to liberate alkyl phenols, thereby forming two layers, an alkyl phenol layer and an aqueous layer, separating the layers and distilling alkyl phenols under conditions to prevent substantial cracking.

5. In the process of producing commercially pure alkyl phenols from a petroleum distillate containing small quantities of the same, the steps comprising extracting the distillate with a quantity of an aqueous alkali hydroxide solution of 35–50% concentration to form an alkali metal alkyl phenolate solution containing free alkali metal hydroxide and a sufficient amount of chemically combined alkyl phenols to prevent precipitation of the alkyl phenolates, said solution containing impurities which form a precipitate only after steaming beyond the point at which the overhead product produced by steaming condenses into a substantially clear condensate, steaming the resulting aqueous alkaline solution at about 100° C. for a time sufficient to expel volatile impurities, and beyond the point at which an overhead product is produced which condenses into a substantially clear condensate, thereby to precipitate substantially all the sludges capable of precipitation by steaming, separating the sludges from the solution of alkyl phenolates, carbonating the desludged solution with an amount of carbon dioxide sufficient to liberate alkyl phenols, thereby forming two layers, an alkyl phenol layer and an aqueous layer, separating the layers, distilling alkyl phenols under conditions to prevent substantial cracking, oxidizing organic hydrosulfides in the distilled alkyl phenols without substantially oxidizing the alkyl phenols, and redistilling the oxidized distillates under conditions substantially to prevent cracking.

6. The process of claim 5 in which the oxidation is carried out by air blowing at a temperature between 140°–150° C.

7. In the process of producing commercially pure alkyl phenols from a petroleum distillate containing small quantities of the same, the steps comprising extracting the distillate with a quantity of an aqueous alkali metal hydroxide solution of 35–50% concentration to form an alkali metal alkyl phenolate solution containing free alkali metal hydroxide and a sufficient amount of chemically combined alkyl phenols to prevent precipitation of the alkyl phenolates, said solution containing impurities which form a precipitate only after steaming beyond the point at which the overhead product produced by steaming condenses into a substantially clear condensate, steaming the resulting aqueous alkali solution at about 100° C. for 4 to 16 hours, beyond the point at which an overhead product is produced which condenses into a substantially clear condensate thereby precipitating actual and potential sludges, separating the sludges from the solution of alkyl phenolates, carbonating the desludged solution with an amount of carbon dioxide sufficient to liberate alkyl phenols, thereby forming two layers, an alkyl phenol layer and an aqueous layer, separating the layers, and distilling the alkyl phenols under conditions to prevent substantial cracking.

8. In the process of producing commercially pure alkyl phenols from a petroleum distillate containing small quantities of the same, the steps comprising extracting the distillate with a quantity of an aqueous alkali metal hydroxide solution of 35–50% concentration to form an alkali metal alkyl phenolate solution containing free alkali metal hydroxide and a sufficient amount of chemically combined alkyl phenols to prevent precipitation of the alkyl phenolates, said solution containing impurities which form a precipitate only after steaming beyond the point at which the overhead product produced by steaming condenses into a substantially clear condensate, steaming the resulting aqueous alkaline solution at about 100° C. for a time sufficient to expel volatile impurities, and beyond the point at which an overhead product is produced which condenses into a substantially clear condensate, thereby to precipitate actual and potential sludges, separating the sludges from the solution of alkyl phenolates containing emulsified organic matter, diluting the desludged solution with an amount of water sufficient to produce a diluted solution containing about 10% alkyl phenolates, thereby precipitating the emulsified matter, separating the precipitate from the solution, carbonating the diluted solution with an amount of carbon dioxide sufficient to liberate alkyl phenols, thereby forming two layers, an alkyl phenol layer and an aqueous layer, separating the layers and distilling alkyl phenols under conditions to prevent substantial cracking.

WALTER J. HUND.
SAMUEL BENSON THOMAS.
DANIEL B. LUTEN, JR.